United States Patent
Huang et al.

(10) Patent No.: US 7,818,369 B2
(45) Date of Patent: Oct. 19, 2010

(54) SYSTEM AND METHOD FOR DISPLAYING DIGITAL IMAGE FILES

(75) Inventors: Teng-Yu Huang, Shenzhen (CN); Jian-Feng Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 219 days.

(21) Appl. No.: 12/255,097

(22) Filed: Oct. 21, 2008

(65) Prior Publication Data

US 2009/0284539 A1    Nov. 19, 2009

(30) Foreign Application Priority Data

May 16, 2008    (CN) .................. 2008 1 0301606

(51) Int. Cl.
*G06F 15/173* (2006.01)
(52) U.S. Cl. .................. 709/203; 709/223; 709/224; 709/228; 709/217; 370/431; 345/564; 345/581; 348/836; 348/736

(58) Field of Classification Search .................. 709/203, 709/223, 224, 228, 217
See application file for complete search history.

(56) References Cited

U.S. PATENT DOCUMENTS

| | | | |
|---|---|---|---|
| 2004/0205582 A1* | 10/2004 | Schiller et al. | 715/513 |
| 2008/0273126 A1* | 11/2008 | Chang | 348/836 |

\* cited by examiner

*Primary Examiner*—Jude J Jean Gilles
(74) *Attorney, Agent, or Firm*—Clifford O. Chi

(57) ABSTRACT

A digital image displaying system includes a DPF and an electronic device communicating with the DPF. The DPF has identification information. The electronic device includes a DPF detecting submodule, a image storing submodule for storing digital image files, a DPF managing submodule, and an information transmitting submodule. The DPF detecting submodule detects identification information of the at least one DPF, the DPF managing submodule stores the identification information therein, the information transmitting submodule transmits network location paths of the digital image files of the image storing submodule to the at least one DPF, the at least one DPF receives the network location paths and displays the digital image files stored in the image storing submodule according to the network location paths. A method for displaying digital image files is also provided.

9 Claims, 3 Drawing Sheets

SYSTEM AND METHOD FOR DISPLAYING DIGITAL IMAGE FILES

BACKGROUND

1. Technical Field

The present disclosure relates to a system and a method for displaying digital image files.

2. Description of the Related Art

A typical digital photo frame (DPF) can be used to store and display digital image files. Usually, the digital image files are copied from a personal computer to the DPF using a portable storage device, such as a portable hard disk drive. However, it is very inconvenient for using the portable storage device to transfer the digital image files to the DPF.

Therefore, there is room for improvement within the art.

DETAILED DESCRIPTION OF THE EMBODIMENTS

Figure 1:
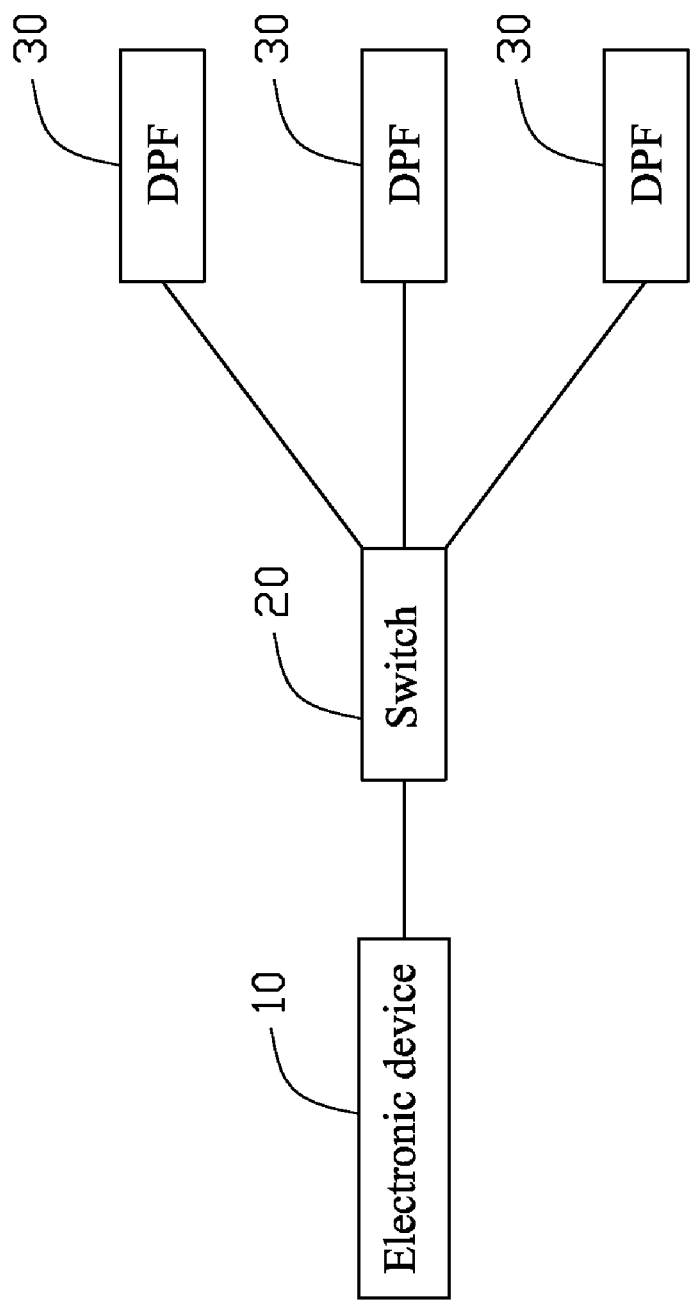
FIG. 1 is a block diagram of an embodiment of a digital image displaying system, the system including an electronic device and a plurality of DPFs.

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

Figure 2:
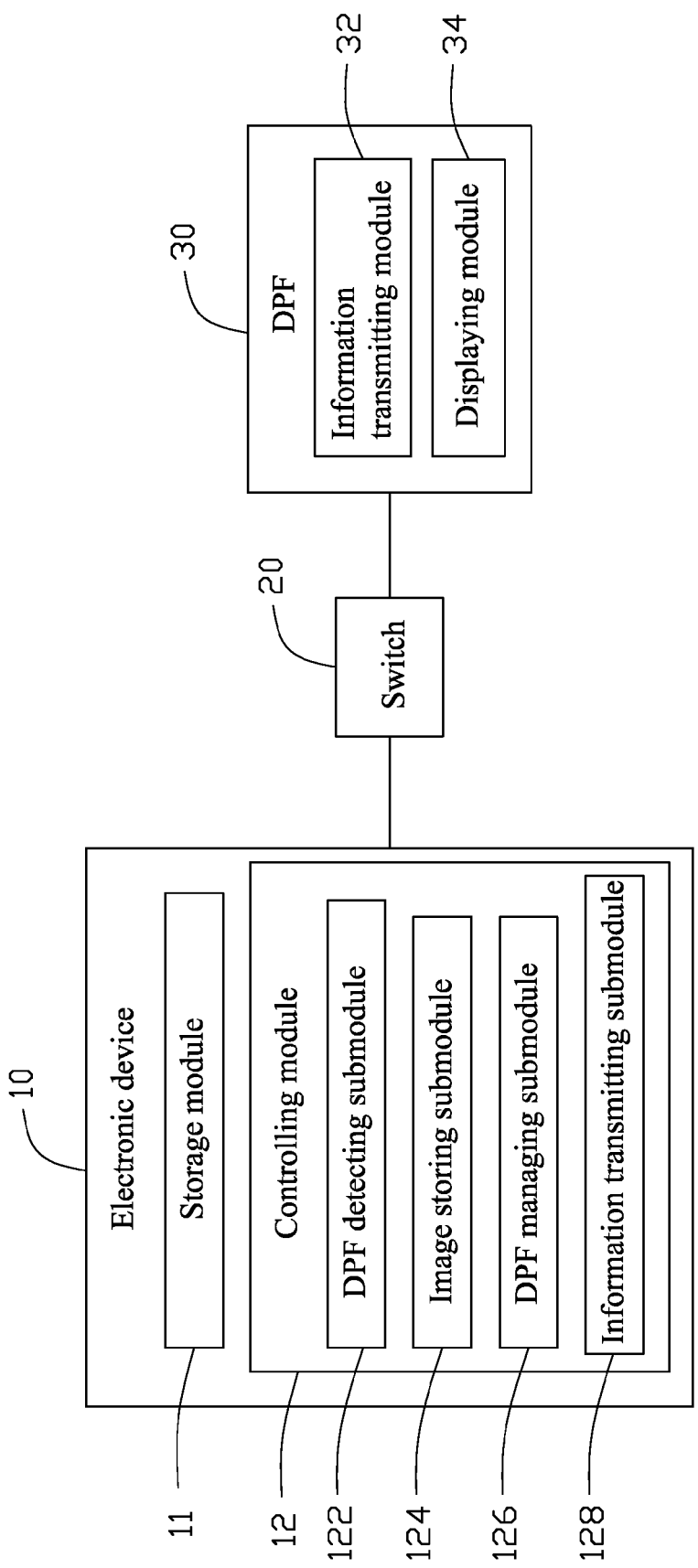
FIG. 2 is a block diagram of the system of FIG. 1.

Referring to FIG. 1, a digital image displaying system includes an electronic device 10 and a plurality of digital photo frames (DPFs) 30 (only three DPFs shown in FIG. 1). The DPFs 30 can be networked with the electronic device 10. For example, as seen in FIGS. 1-2, the DPFs 30 are networked with the electronic device 10 via a switch 20. The switch 20 can provide dynamic host configuration protocol service for the electronic device 10 and the DPFs 30.

Referring to FIG. 2, the electronic device 10 may be a personal computer or a server, and includes a controlling module 12 and a storage module 11 capable of storing digital image files. The controlling module 12 includes a DPF detecting submodule 122, an image storing submodule 124, a DPF managing submodule 126, and an information transmitting submodule 128. The DPF detecting submodule 122 can be used to detect and receive identification information of the DPFs 30 when the DPFs 30 are started/powered on. The identification information of each DPF 30 may be an internet protocol address or a media access control address. The image storing submodule 124 can be used to store digital image files copied from the storage module 11. The DPF managing submodule 126 can be used to manage the identification information of the DPFs 30, e.g., to store and edit the identification information thereof. For example, when one of the DPFs 30 is placed in certain physical location, e.g., a living room, the identification information can be edited to assign an alias to the one of the DPFs 30 placed in the living room. After the identification information of the DPFs 30 is stored in DPF managing submodule 126, the DPFs 30 can be allowed to access the digital image files stored in the image storing submodule 124. The information transmitting submodule 128 can send the network location paths of the digital image files stored in the image storing submodule 124 to the DPFs 30 using the identification information stored in the DPF managing submodule 126 when the controlling module 12 receives a display request from the DPFs 30.

Each DPF 30 includes an information transmitting module 32, and a displaying module 34. The information transmitting module 32 is capable of sending identification information of the DPFs 30 to the electronic device 10 via the switch 20 when the DPFs 30 are started. The displaying module 34 can receive the network location paths of the digital image files sent from the electronic device 10, and automatically display the digital image files through the network location paths.

Figure 3:
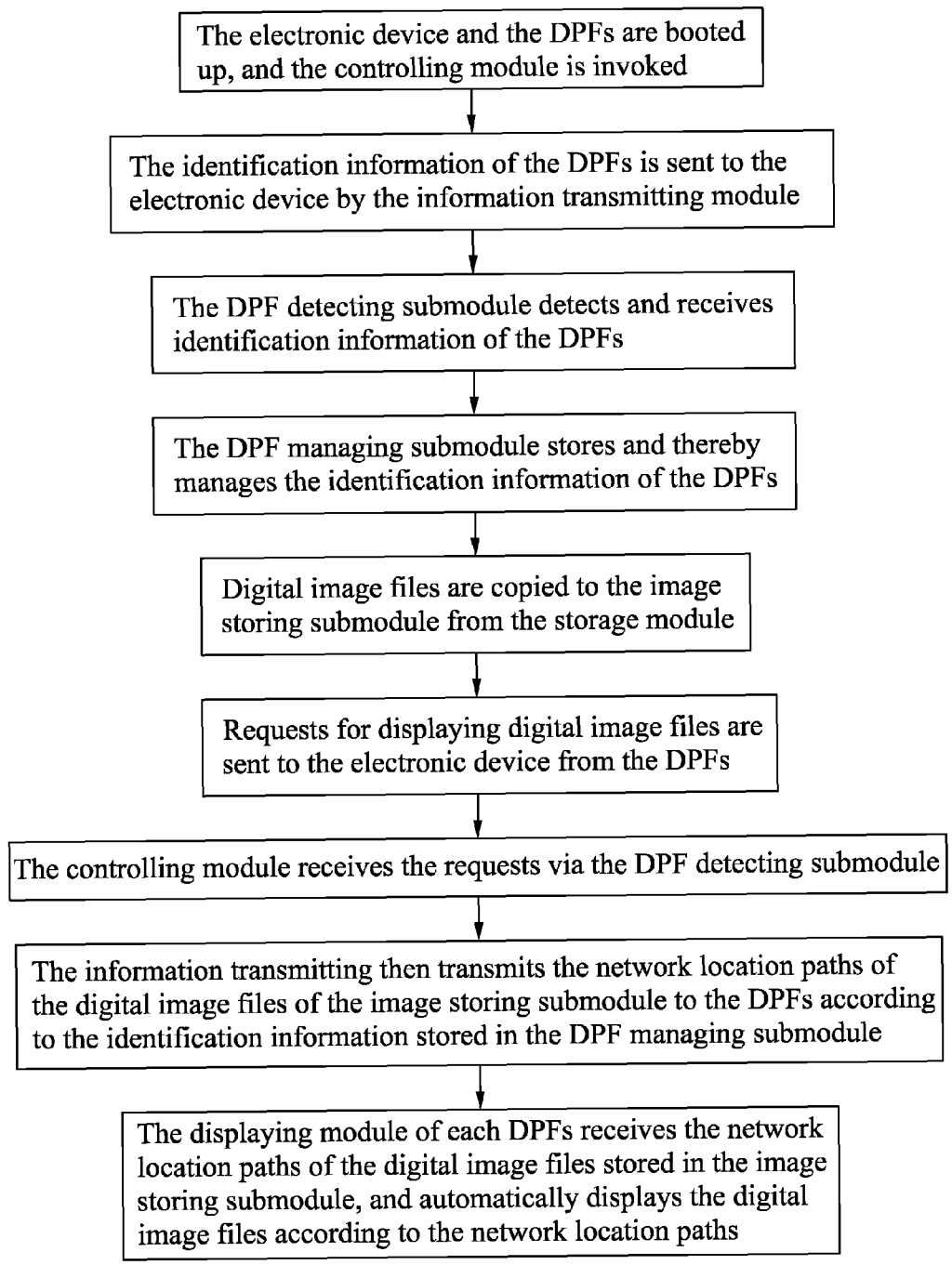
FIG. 3 is a flow chart illustrating an embodiment of a method using the system of FIG. 1.

Referring also to FIG. 3, the electronic device 10 and the DPFs 30 are booted up, and the controlling module 12 is invoked. The identification information of the DPFs 30 is sent to the electronic device 10 by the information transmitting module 32. The DPF detecting submodule 122 detects and receives identification information of the DPFs 30. The DPF managing submodule 126 stores and thereby manages the identification information of the DPFs 30. Digital image files are copied to the image storing submodule 124 from the storage module 11. The display requests for displaying digital image files are sent to the electronic device 10 from the DPFs 30. The controlling module 12 receives the requests via the DPF detecting submodule 122. The information transmitting submodule 128 then transmits the network location paths of the digital image files of the image storing submodule 124 to the DPFs 30 according to the identification information stored in the DPF managing submodule 126. The displaying module 34 of each DPFs 30 receives the network location paths of the digital image files stored in the image storing submodule 124, and automatically displays the digital image files according to the network location paths.

In addition, the DPFs 30 can directly display digital image files stored in the image storing submodule 124 of the electronic device 10, so when the digital image files of the DPFs 30 need to be changed/swapped, this can be conveniently done by changing the digital image files in the image storing submodule 124, and no other reconfigurations or actions is required on the DPFs 30.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A digital image displaying system comprising:

at least one digital photo frame (DPF) networked with an electronic device, the at least one DPF having identification information; and the electronic device comprising a DPF detecting submodule, a image storing submodule for storing digital image files, a DPF managing submodule, and an information transmitting submodule, wherein the DPF detecting submodule detects identification information of the at least one DPF, the DPF managing submodule stores the identification information therein, the information transmitting submodule transmits network location paths of the digital image files of the image storing submodule to the at least one DPF, the at least one DPF receives the network location paths and displays the digital image files stored in the image storing submodule according to the network location paths.

2. The system of claim 1, wherein the DPF managing submodule is capable of editing the identification information of the at least one DPF.

3. The system of claim 1, wherein the at least one DPF comprises an information transmitting module for transmitting identification information to the electronic device.

4. The system of claim 3, wherein the at least one DPF further comprises a displaying module capable of receiving the network location paths of the digital image files stored in the image storing submodule, and displaying the digital image files according to the network location paths.

5. The system of claim 1, further comprising a switch; the at least one DPF is networked with the electronic device via the switch; the switch can provide dynamic host configuration protocol service for the electronic device and the at least one DPF.

6. The system of claim 1, wherein the identification information of the at least one DPF may be an internet protocol address or a media access control address.

7. A method for displaying digital image files of an electronic device, comprising:

providing at least one digital photo frame (DPF);
detecting identification information of the at least one DPF by a DPF detecting submodule of the electronic device;
storing the identification information in a DPF managing submodule;
transmitting network location paths of the digital image files of the electronic device to the at least one DPF according to the identification information of the at least one DPF; and
displaying the digital image files by the at least one DPF according to the network location paths thereof.

8. The method of claim 7, further comprising copying the digital image files from a storage module of the electronic device to an image storing submodule of the electronic device.

9. The method of claim 7, further comprising sending requests for displaying the digital image files from the at least one DPF to the electronic device, after storing the identification information in the DPF managing submodule, and before transmitting network location paths to the digital image files of the electronic device to the at least one DPF according to the identification information of the at least one DPF.

* * * * *